United States Patent
Fujioka et al.

(10) Patent No.: US 7,066,655 B2
(45) Date of Patent: Jun. 27, 2006

(54) THRUST BEARING (75) Inventors: Norio Fujioka, Shizuoka (JP); Kazuyuki Yamamoto, Shizuoka (JP)

(73) Assignee: NTN Corporation, Osaka (JP)

( * ) Notice: Subject to any disclaimer, the term of this patent is extended or adjusted under 35 U.S.C. 154(b) by 148 days.

(21) Appl. No.: 10/376,250

(22) Filed: Mar. 3, 2003

(65) Prior Publication Data
US 2003/0165281 A1 Sep. 4, 2003

(30) Foreign Application Priority Data
Mar. 4, 2002 (JP) ............................. 2002-057462

(51) Int. Cl.
F16C 19/30 (2006.01)
F16C 33/00 (2006.01)
F16C 27/04 (2006.01)

(52) U.S. Cl. ...................... 384/618; 384/625; 384/580

(58) Field of Classification Search ................ 384/618, 384/625, 609, 614, 615, 617, 621, 622, 580, 384/581
See application file for complete search history.

(56) References Cited

U.S. PATENT DOCUMENTS

| | | | | |
|---|---|---|---|---|
| 4,225,200 A | * | 9/1980 | Dougall ....................... 384/621 |
| 4,466,751 A | * | 8/1984 | Higuchi ....................... 384/126 |
| 4,696,588 A | * | 9/1987 | Tanaka et al. ............... 384/615 |
| 4,883,374 A | * | 11/1989 | Rhoads et al. .............. 384/618 |
| 4,981,373 A | * | 1/1991 | Bando ......................... 384/620 |
| 5,232,290 A | * | 8/1993 | Buschle et al. ............. 384/448 |
| 5,489,255 A | * | 2/1996 | Hinckley et al. ........... 384/620 |
| 5,938,349 A | * | 8/1999 | Ogawa ........................ 384/615 |
| 6,517,249 B1 | * | 2/2003 | Doll ............................ 384/492 |
| 6,520,685 B1 | * | 2/2003 | Urmaza ....................... 384/620 |
| 6,752,535 B1 | * | 6/2004 | Krochak ...................... 384/623 |

FOREIGN PATENT DOCUMENTS

| JP | 2002-166365 | * | 6/2002 |
|---|---|---|---|
| JP | 2003-083339 | | 3/2003 |

* cited by examiner

Primary Examiner—Richard W. Ridley
Assistant Examiner—Colby Hansen
(74) Attorney, Agent, or Firm—Wenderoth, Lind & Ponack, L.L.P.

(57) ABSTRACT

An integral type thrust bearing is proposed which can be manufactured with fewer heat treatment steps. The retainer and the inner and outer rollers not hardened are assembled together with rollers into a bearing and thereafter the assembled bearing is carburized, hardened and tempered. This eliminates the need for individual heat treatment of the retainer and the inner and outer rings and decreases heat treatment steps for the production of thrust bearings.

8 Claims, 8 Drawing Sheets

Prior Art

Fig. 10B

Prior Art

THRUST BEARING

BACKGROUND OF THE INVENTION

This invention relates to an integral type thrust bearing in which a bearing ring and a retainer for housing rollers are mounted inseparably.

Among thrust bearings, there is an integral type in which the bearing rings and the retainer for housing the rollers are mounted inseparably from each other so that the thrust bearing can be easily mounted in a housing or on a shaft.

Figure 10A:
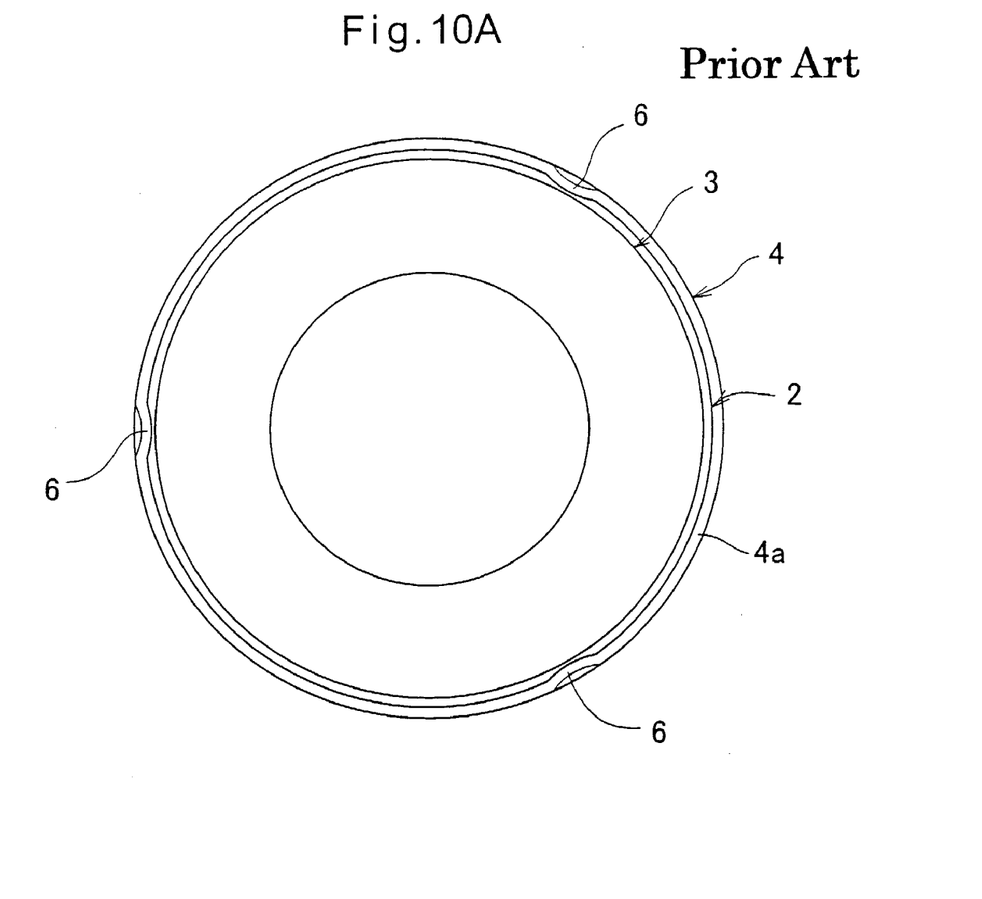
FIG. 10A is a plan view showing a conventional thrust bearing.
Figure 10B:
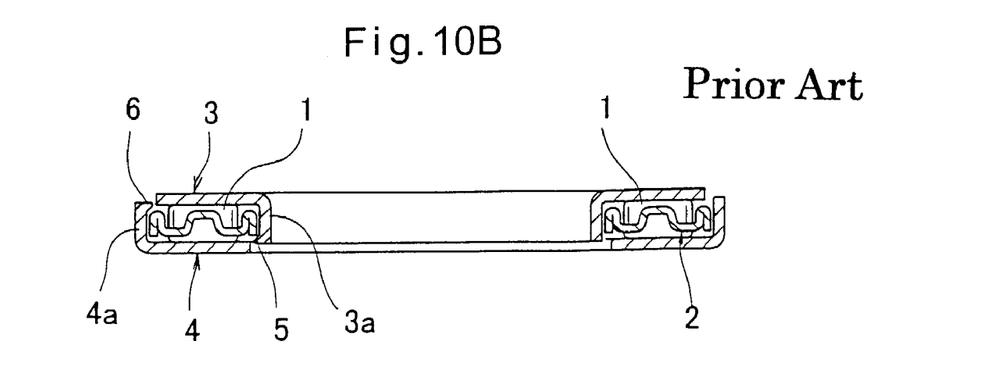
FIG. 10B is a longitudinal sectional view thereof.

FIGS. 10A and 10B show an example of such an integral type thrust bearing. It is a three-part type bearing having a retainer 2 for radially housing a plurality of rollers 1, an inner ring 3 having a flange 3a on the inner-diameter side, and an outer ring 4 having a flange 4a on the outer-diameter side. The inner and outer edges of the retainer 2 are engaged by outwardly protruding claws 5 and inwardly protruding claws 6 formed by staking at the tips of the flanges 3a and 4a, respectively, so that the inner and outer rings 3, 4 and the retainer 2 are inseparable from each other. Among integral type thrust bearings, there are two-part type bearings which include only one of the inner and outer rings and the retainer is inseparable from the inner or outer ring.

In these integral type thrust bearings, the bearing rings, retainer and rollers are individually heat-treated beforehand, and thereafter, they are assembled into an integral unit. Normally, the bearing rings and the retainer are subjected to carburizing, hardening and tempering after forming. The rollers are hardened and tempered after rough forming, and then subjected to finish grinding. The retainer is in some cases subjected to soft nitriding instead of carburizing, hardening and tempering.

With such a conventional integral type thrust bearing, since the bearing rings, retainer and rollers are individually heat-treated before assembling, heat treatment steps increase, so that the heat treatment cost increases. Also, the manufacturing period tends to be long for adjustment of heat treatment steps for the respective parts.

In order that even if a radial gap in the bearing increases, the bearing rings and the retainer can be made inseparable to increase the eccentricity allowance of an integral type thrust bearing, the present applicant proposed in JP patent application 2001-272336 to form the flanges of the bearing rings by bending instead of staking, thereby increasing the protruding amounts of the claws. In order to form such markedly protruding claws by bending, such bending has to be carried out after the retainer has been mounted. Thus, during heat treatment of the bearings, it is necessary to prevent hardening of the portions to be bent, or add a step of annealing the bent portions after heat treatment.

An object of this invention is to reduce heat treatment steps in the manufacture of an integral type thrust bearing.

SUMMARY OF THE INVENTION

According to this invention, there is provided a thrust bearing comprising a retainer formed with pockets for radially housing a plurality of rollers, and at least one of an inner ring having a flange on its inner-diameter side and an outer ring having a flange on its outer-diameter side, the flange restricting a radial gap in the thrust bearing, so that the bearing ring and the retainer are made inseparable from each other. After the bearing ring and the retainer have been assembled together with the rollers into a bearing with the bearing ring and the retainer not hardened, the thus assembled bearing is subjected to carburizing, hardening and tempering. With this arrangement, it is not necessary to heat treat the bearing ring and the retainer individually, so that the heat treatment steps of the bearing decrease. For the rollers, they may be ones that have been heat-treated before assembling the bearing or ones that have not been heat-treated.

According to this invention, claws are formed by staking or bending at a tip of the flange of the inner or outer ring so as to protrude toward the retainer and engage the inner or outer peripheral edge of the retainer, and the bearing ring and the retainer are made inseparable from each other by the claws.

The retainer may be made of a thin steel plate, and the radial section of the pockets for housing the rollers may be formed in the shape of a W or an inverted V to make the retainer inexpensive.

If the retainer is formed with pockets having a radial section in the shape of an inverted V, substantially the radial center of roller guide surfaces on both sides of the inverted V-shaped pockets is compressed to form by plastic flow roller stopping claws protruding inwardly of the pockets from the respective roller guide surfaces. The roller stopping claws serve to prevent the rollers from coming out during assembly of the bearing. In particular, in a two-part type thrust bearing in which the pockets are open on one side, they are also effective in preventing the rollers from coming out during carburizing, hardening and tempering after assembling the bearing.

By forming recesses for receiving excess retainer material that plastically flows by compression on both sides of the portion of the roller guide surface where the roller stopping claw is to be formed, it is possible to prevent local wear of the rollers by eliminating build-up of excess material by plastic flow on the roller guide surfaces.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1A:
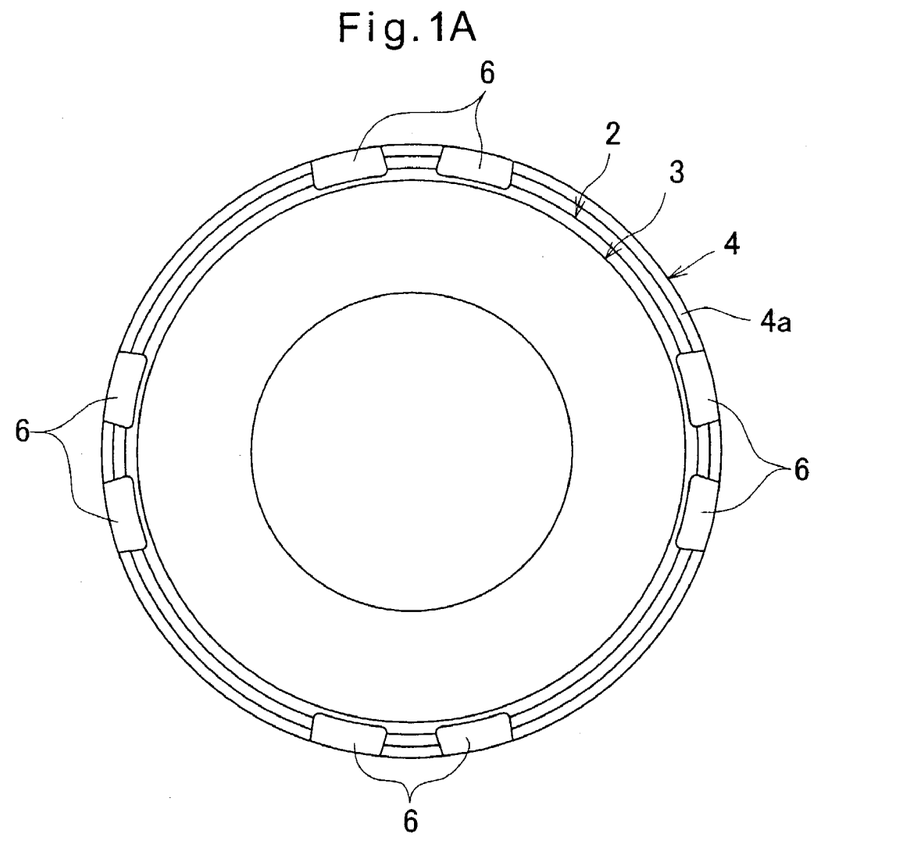
FIG. 1A is a plan view showing a thrust bearing of a first embodiment.
Figure 1B:
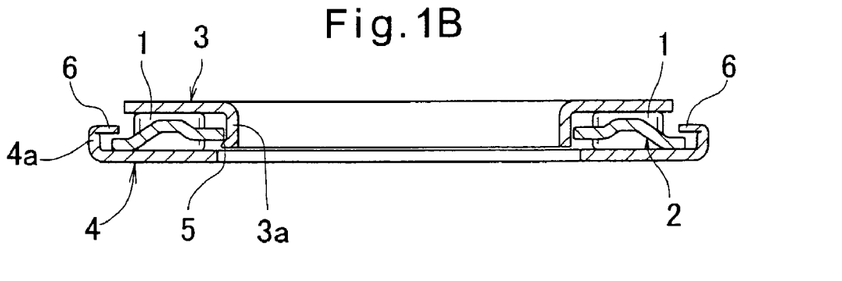
FIG. 1B is a longitudinal sectional view thereof.

Hereinbelow, with reference to FIGS. 1A–9C, the embodiments of this invention will be described. FIGS. 1A–3C show the first embodiment. This thrust bearing is, as shown in FIGS. 1A and 1B, of a three-part type having a retainer 2 for housing a plurality of rollers 1, an inner ring 3 having a flange 3a on its inner-diameter side, and an outer ring 4 having a flange 4a on its outer-diameter side. A radial gap in the bearing is set at a large value so that the inner and outer peripheral surfaces of the retainer 2 will not contact the flanges 3a or 4a even if a marked eccentric rotation occurs.

Figure 1C:
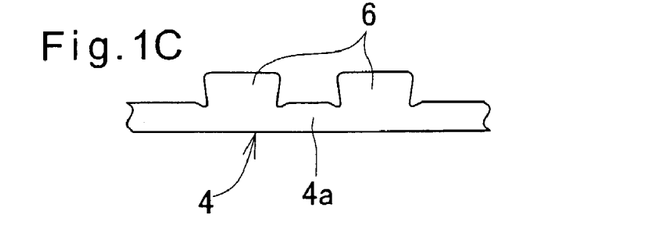
FIG. 1C is a front view showing claws of an outer ring of the thrust bearing of FIG. 1A before bending.

The inner ring 3 and the outer ring 4 have their respective flanges 3a and 4a formed by pressing thin steel plates (SPC or SCM). At the tip of the flange 4a of the outer ring 4, a plurality of claws 6 are formed by bending so as to protrude inwardly by a longer distance than a bearing inner gap. These claws 6 engage the outer peripheral edge of the retainer 2 so that the retainer 2 and the outer ring 4 are inseparable from each other. Each claw 6 has its thickness reduced beforehand by forming a step to make bending easy. As shown in FIG. 1C, on both sides of the base of each claw 6, cutouts are formed. The retainer 2 and the inner ring 3 are made inseparable by outward claws 5 formed by staking at the tip of the flange 3a.

Figure 2A:
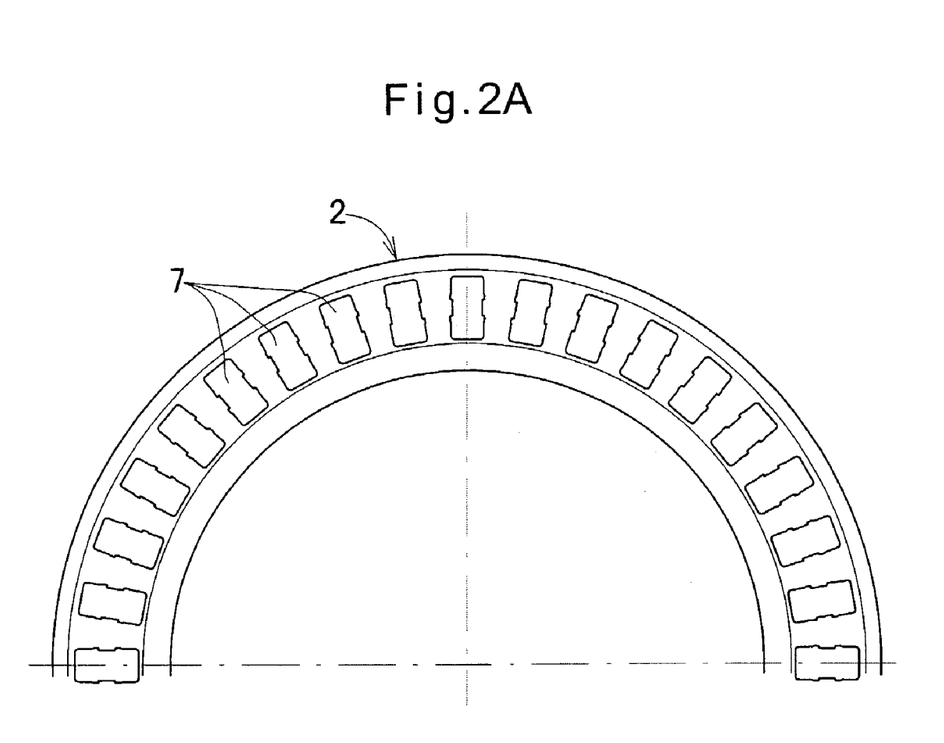
FIG. 2A is a plan view of a retainer of the thrust bearing of FIG. 1.
Figure 2B:
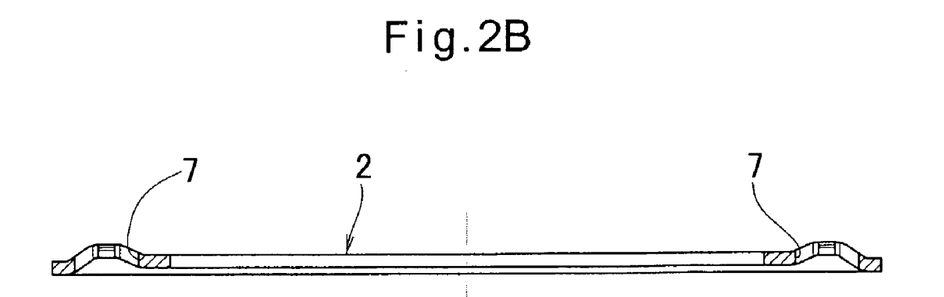
FIG. 2B is a longitudinal sectional view of the retainer of FIG. 2A.

The retainer 2 is formed by pressing a thin steel plate (SPC). As shown in FIGS. 2A and 2B, pockets 7 of the retainer 2 for radially receiving the rollers 1 have an inverted V-shaped radial section, and the inner and outer peripheral edges of the retainer 2 which engage the respective claws 5 and 6 are formed flat.

Figure 3A:
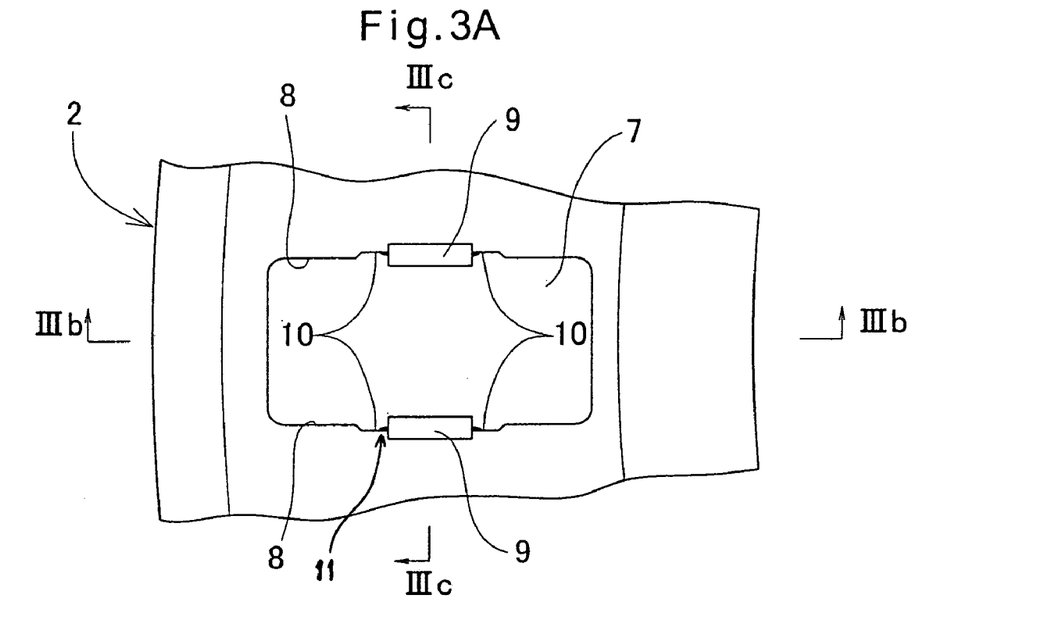
FIG. 3A is a partial enlarged bottom view of the retainer of FIG. 2A.
Figure 3B:
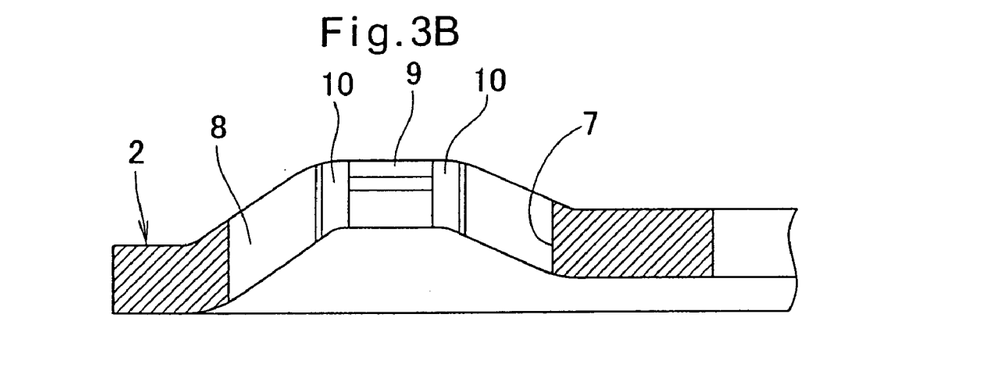
FIG. 3B is a sectional view along line IIIb—IIIb of FIG. 3A.
Figure 3C:
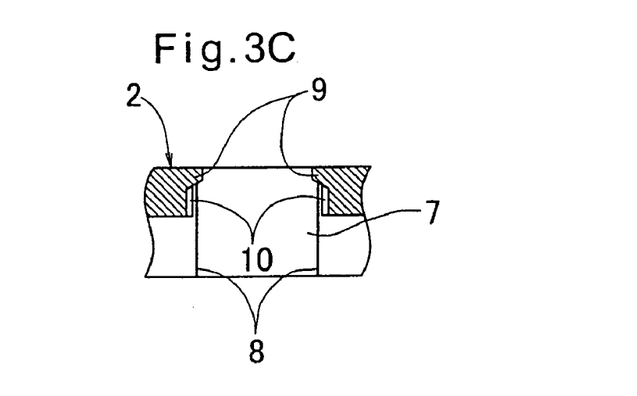
FIG. 3C is a sectional view along line IIIc—IIIc of FIG. 3A.

As shown in FIGS. 3A, 3B and 3C, at substantially radially central portions of roller guide surfaces 8 on both sides of each of the inverted V-shaped pockets 7, roller stopping claws 9 that protrude inwardly from the roller guide surfaces 8 are formed by plastic flow by compressing these portions. On both sides thereof, recesses 10 are formed to receive excess material 11 that plastically flows by compression. Thus, the rollers 1, which are housed in the respective pockets 7, are prevented from coming off by the roller stopping claws 9 on both sides, and are guided by the smooth roller guide surfaces 8 which are free of bulging formed by excess material. Thus, their life will not be shortened due to local wear.

After being assembled into an integral unit as shown in FIGS. 1A and 1B, the thrust bearing is carburized in a carburizing atmosphere, hardened in oil, and subjected to tempering. The rollers 1, which are formed of a bearing steel (SUJ2), are subjected to hardening and tempering before assembling the bearing.

The thrust bearings of the below-described embodiments and modified examples are, as with the first embodiment, carburized, hardened and tempered after assembling, and the materials of the parts are the same as in the first embodiment.

Figure 4:
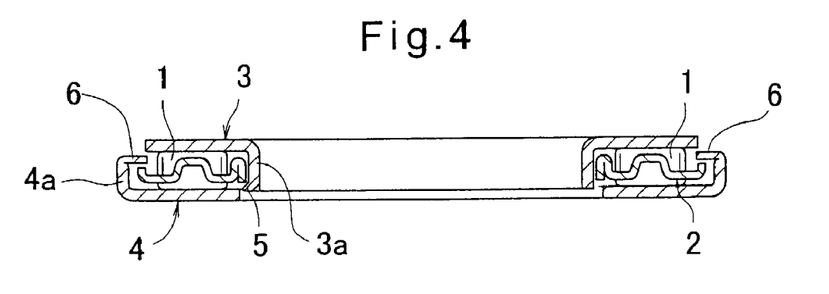
FIG. 4 is a longitudinal sectional view showing a modified example of the thrust bearing of FIG. 1.

FIG. 4 shows a modification of the first embodiment. It differs therefrom in that the retainer is formed in the shape of a W in radial section by pressing. The shapes of the rollers 1, and inner and outer rings 3, 4 are the same as in the first embodiment.

Figure 5A:
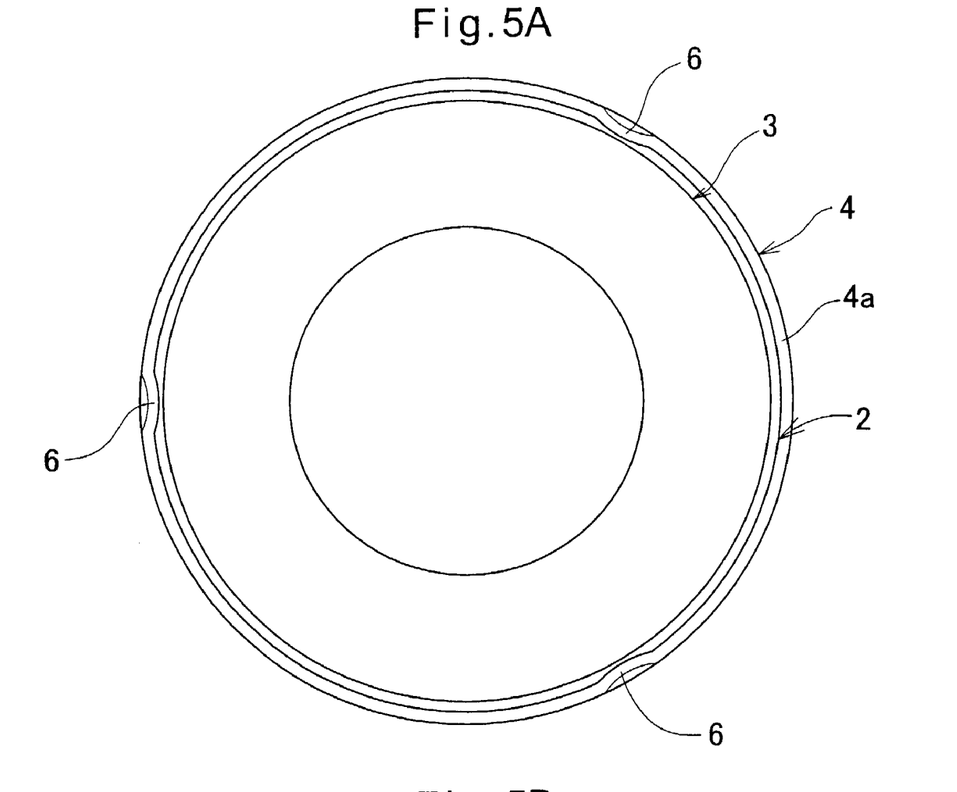
FIG. 5A is a plan view showing a thrust bearing of a second embodiment.
Figure 5B:
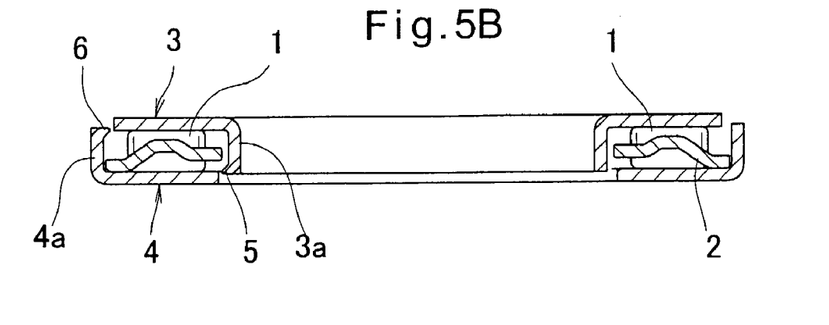
FIG. 5B is a longitudinal sectional view thereof.

FIGS. 5A and 5B show the second embodiment. It is also of a three-part type bearing, and differs in that claws 5 and 6 provided at the tips of the flanges 3a and 4a of the inner and outer rings 3, 4 are both formed by staking. Otherwise it is the same as the first embodiment.

Figure 6A:
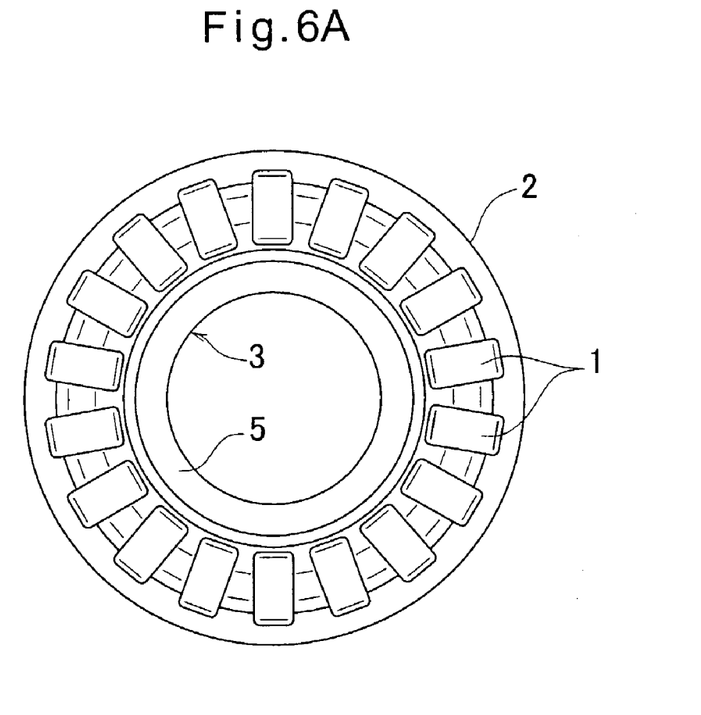
FIG. 6A is a plan view showing a thrust bearing of a third embodiment.
Figure 6B:
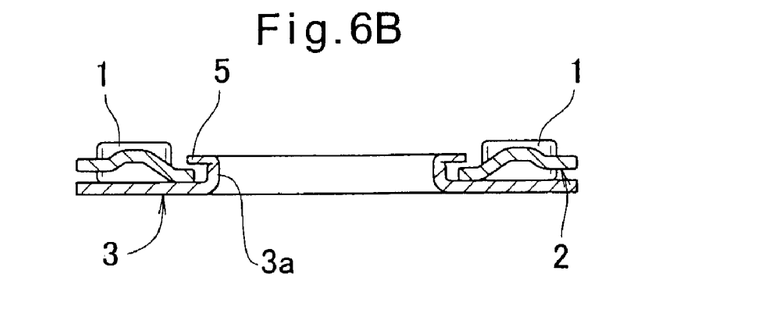
FIG. 6B is a longitudinal sectional view thereof.

FIGS. 6A and 6B show the third embodiment. It is of a two-part type bearing having a retainer 2 for radially housing a plurality of rollers 1, and an inner ring 3 having a flange 3a on its inner-diameter end. At the tip of the flange 3a of the inner ring 3, an outwardly protruding claw 5 is formed over the entire circumference. The claw 5 engages the inner peripheral edge of the retainer 2 so that the retainer 2 and the inner ring 3 are inseparable from each other. The claws 5 have their thickness reduced beforehand by forming a step to make bending easy.

Figure 7:
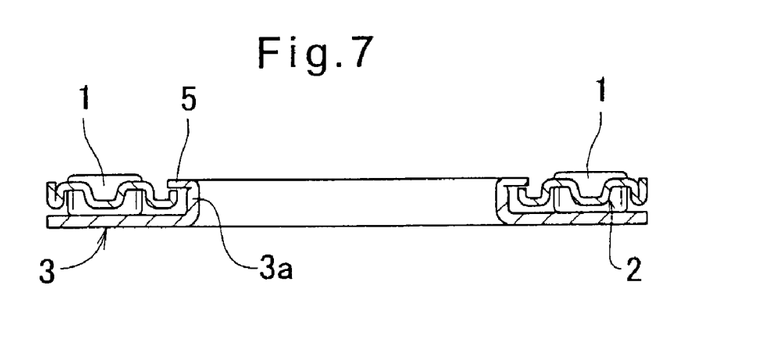
FIG. 7 is a longitudinal sectional view showing a modified example of the thrust bearing of FIG. 6.

As with the first embodiment, the retainer 2 is formed with pockets 7 having their radial section formed in the shape of an inverted V by pressing. While not shown, at substantially radially central portions of the roller guide surfaces 8 on both sides of each pocket 7, inwardly protruding claws 9 are formed. On both sides thereof, recesses 10 for receiving excess material are formed. FIG. 7 shows a variant of the third embodiment. It differs in that the radial sectional shape of the retainer 2 is formed in the shape of a W by pressing. The shapes of the rollers 1, and inner and outer rings 3, 4 are the same as in the third embodiment.

Figure 8A:
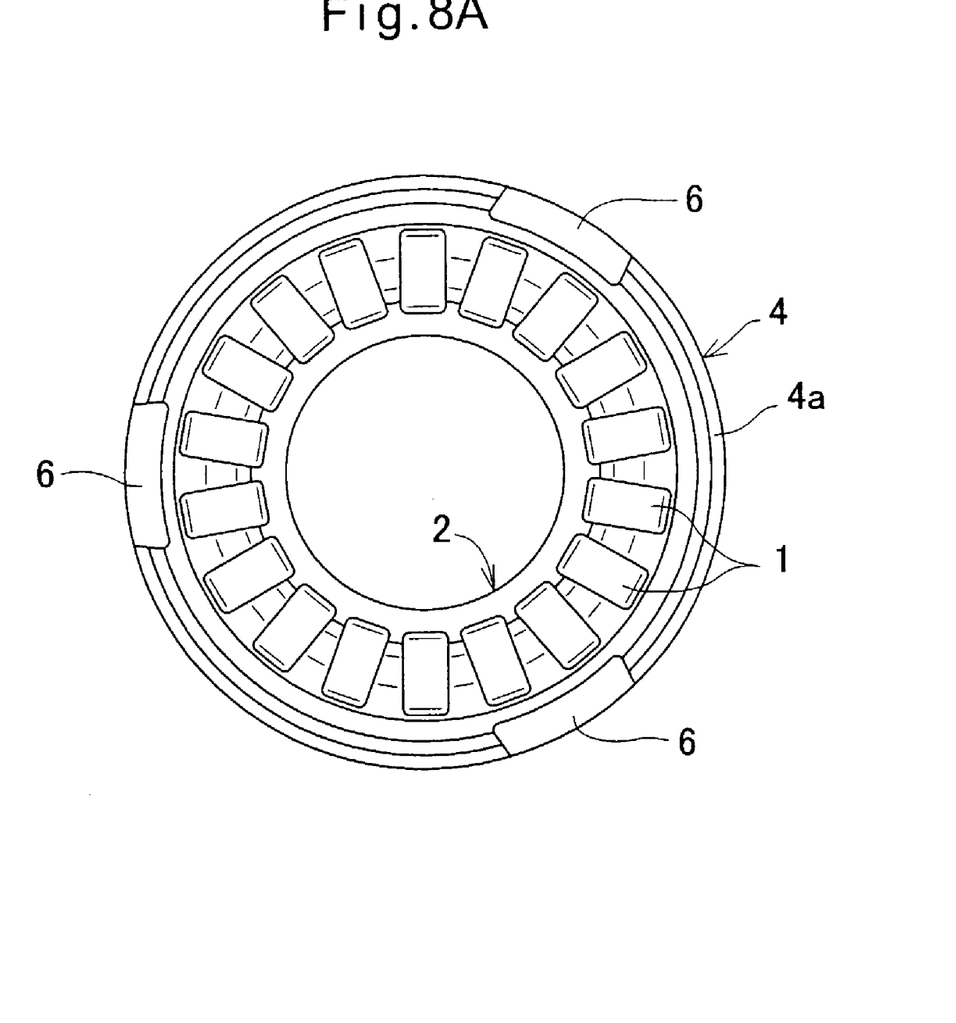
FIG. 8A is a plan view showing a thrust bearing of a fourth embodiment.
Figure 8B:
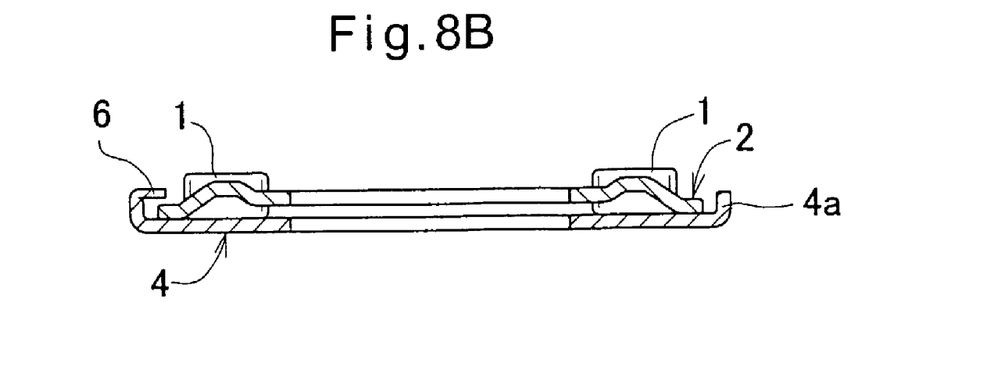
FIG. 8B is a longitudinal sectional view thereof.

FIGS. 8A and 8B show the fourth embodiment. It is of a two-part bearing type having a retainer 2 for radially housing a plurality of rollers 1, and an outer ring 4 having a flange 4a on its outer-diameter side. Inwardly protruding claws 6 are partially formed at the tip of the flange 4a. The claws 6 engage the outer peripheral edge of the retainer 2 so that the retainer 2 and the outer ring 4 are inseparable from each other. The retainer 2 is the same as in the first embodiment, and the radial section of each pocket 7 is formed in an inverted V shape by pressing.

Figure 9A:
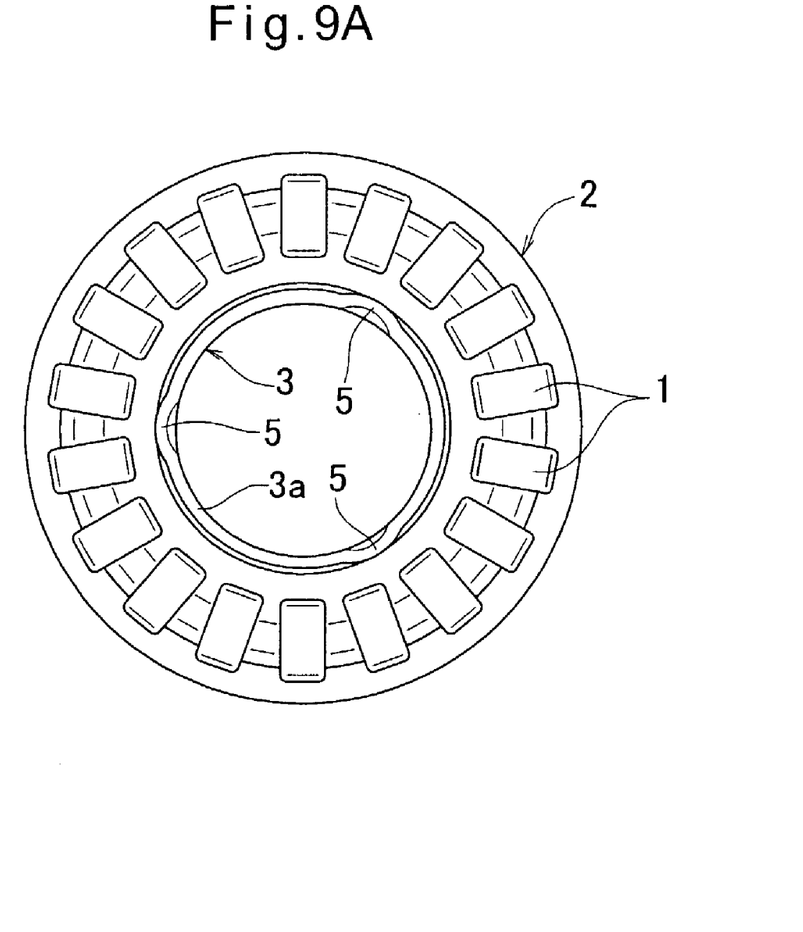
FIG. 9A is a plan view showing a thrust bearing of a fifth embodiment.
Figure 9B:
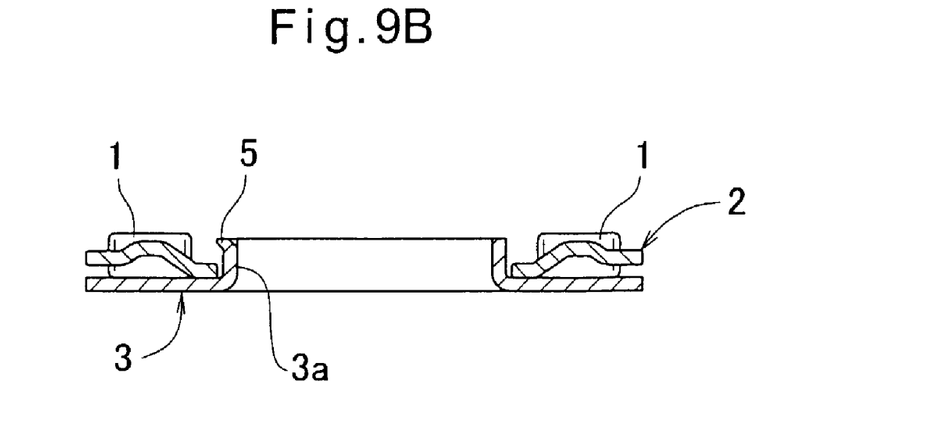
FIG. 9B is a longitudinal sectional view thereof.

FIGS. 9A and 9B show the fifth embodiment. It is also of a two-part type bearing and differs from the third embodiment in that claws 5 at the tip of a flange 3a provided on the inner-diameter side of the inner ring 3 are formed by staking. Otherwise it is the same as the third embodiment.

In the above-described thrust bearings of the embodiments, the bearing ring or rings and the retainer are both formed by pressing thin steel plates. But one or both of them may be formed by machining steel material.

The following are an Example and a Comparative Example.

EXAMPLE

Thrust bearings were prepared which were of a three-part type bearing as shown in FIGS. 1A–1C and which were subjected to carburizing/hardening/tempering after assembling. As for the heat treatment conditions, they were carburized by keeping at 850° C. for 35 minutes in a carburizing atmosphere, oil-hardened and then subjected to tempering at 165° C. for 60 minutes. The rollers 1 were used which were oil-hardened at 840° C. for 30 minutes beforehand, and then subjected to tempering at 180° C. for 90 minutes. The bearing dimensions were as follows: inner diameter: 56 mm, outer diameter: 76 mm, and thickness: 4.8 mm.

COMPARATIVE EXAMPLE

Thrust bearings were prepared which were of a three-part type bearing as shown in FIGS. 10A and 10B and in which the respective parts were individually heat-treated before assembling. As for the heat treatment conditions, the rollers 1 were oil-hardened at 840° C. for 30 minutes, and then subjected to tempering at 180° C. for 90 minutes. The retainer 2 was subjected to soft nitriding at 580° C. for 35 minutes. The inner and outer rings 3, 4 were subjected to carburizing by holding them at 850° C. for 60 minutes in a carburizing atmosphere, oil-hardened and then subjected to tempering at 165° C. for 60 minutes. The bearing dimensions and the number of rollers 1 were the same as in the Example.

For the thrust bearings of the Example and the Comparative Example, a rolling life test was conducted. In the rolling life test, with the inner ring 3 mounted at the rotating side and the outer ring 4 at the fixed side, they were mounted on a thrust rotary tester and the test was conducted under the following conditions for two cases, one in which axis eccentricity existed and the other in which it did not exist. For both the Example and the Comparative Example, the number of samples was ten, and the rolling life was evaluated in terms of L10 life (in which 90% of the samples can be used without being destroyed)

Axial load: 4300 N
Rotating speed: 3000 rpm
Axis eccentricity: 0.0 mm, 0.5 mm
Lubricating oil: ATF (Automatic transmission fluid)

TABLE 1

|  |  |  | Example | Compara. example |
|---|---|---|---|---|
| Vickers hardness | roller | surface | 765 | 700~800 |
|  |  | Inside | 790 | 700~800 |
|  | retainer | surface | 730 | 380~500 |
|  |  | Inside | 175 | 150~220 |
|  | outer & inner rings | surface | 710 | 650~800 |
|  |  | inside | 380 | 350~500 |
| Life ratio | No axis eccentricity |  | 1.1 | 1.0 |
|  | Axis eccentricity existed |  | 1.0 | 0.5 |

The results are shown in Table 1. The rolling lives of the Example and Comparative Example are shown in terms of life ratio in comparison with the L10 life of the Comparative Example when no axis eccentricity of rotation existed. In Table 1, the Vickers hardness Hv on the surface of and inside the bearing parts are also shown. The hardnesses Hv of the respective parts of the Example are not so different from those of the Comparative Example in which the parts were individually heat-treated. The hardnesses Hv of the parts of the Example are the values actually measured this time. The hardnesses Hv of the parts of the Comparative Example, which is a conventional article, are the values obtained previously.

The test results show that the rolling lives of the thrust bearings of the Example are substantially equal to the rolling life of the Comparative Example irrespective of whether or not axial eccentricity existed. Thus it was confirmed that the rolling life equivalent to those of conventional articles can be achieved even if heat treatment steps are reduced by carrying out carburizing, hardening and tempering after assembling. The reason why in the Comparative Example, when axis eccentricity existed, the rolling life decreased to half is because, as described above, in the conventional articles, the retainer was made inseparable by the claws formed by staking, so that the radial gap in the bearing was small. As described above, in the thrust bearing of this invention, after the bearing rings and the retainer have been assembled together with rollers into a bearing with the bearing rings and the retainer not hardened, the thus assembled bearing is subjected to carburizing, hardening and tempering. Thus, it is not necessary to individually heat-treat the bearing rings and the retainer, and it is possible to reduce the heat treatment steps of the bearing and thus to markedly reduce the manufacturing cost. Also, the manufacturing steps are simplified, so that it is possible to shorten the manufacturing period.

The invention claimed is:

1. A thrust bearing comprising:
    a retainer formed with pockets for radially housing a plurality of rollers, each of said pockets being defined between circumferentially spaced roller guide surfaces that are free of bulges projecting into said pockets and that are configured for guiding said rollers;
    a bearing ring having a flange on at least one of an inner-diameter side and an outer-diameter side, said flange restricting a radial gap in the thrust bearing, said bearing ring comprising at least one of an inner ring and an outer ring;
    wherein roller-stopping claws are formed at substantially radial centers of said roller guide surfaces on both sides of each of said pockets, said roller-stopping claws protruding inwardly into said pockets from the respective roller guide surfaces so as to project inwardly beyond the respective roller guide surfaces; and
    wherein, on both sides of each of said roller-stopping claws, recesses are formed in the respective roller guide surfaces of each of the respective pockets said recesses having received excess material due to plastic flow in forming of said roller-stopping claws.

2. A thrust bearing as claimed in claim 1, wherein retainer-restricting claws are formed at a tip of said flange so as to protrude toward said retainer and engage the inner or outer peripheral edge of said retainer, such that said bearing ring and said retainer are made inseparable from each other.

3. A thrust bearing as claimed in claim 2, wherein said retainer is made of a thin steel plate.

4. A thrust bearing as claimed in claim 3, wherein each of said pockets is formed in an inverted V shape in radial section.

5. A thrust bearing as claimed in claim 2, wherein each of said pockets is formed in an inverted V shape in radial section.

6. A thrust bearing as claimed in claim 1, wherein each of said pockets is formed in an inverted V shape in radial section.

7. A thrust bearing as claimed in claim 1, wherein said retainer is made of a thin steel plate.

8. A thrust bearing as claimed in claim 7 wherein each of said pockets is formed in an inverted V shape in radial section.

* * * * *